(12) United States Patent
Popov

(10) Patent No.: US 6,280,578 B1
(45) Date of Patent: Aug. 28, 2001

(54) OPERATION PROCESS OF A PUMPING-EJECTION STAND FOR DISTILLING LIQUID PRODUCTS

(75) Inventor: Serguei A. Popov, 4615 Post Oak Pl., Suite 140, Houston, TX (US) 77027

(73) Assignees: Evgueni D. Petroukhine, Limassol (CY); Serguei A. Popov, Budapest (HU)

(*) Notice: Subject to any disclaimer, the term of this patent is extended or adjusted under 35 U.S.C. 154(b) by 0 days.

(21) Appl. No.: 09/202,773
(22) PCT Filed: Apr. 20, 1998
(86) PCT No.: PCT/RU98/00115
§ 371 Date: Dec. 28, 1998
§ 102(e) Date: Dec. 28, 1998
(87) PCT Pub. No.: WO98/47591
PCT Pub. Date: Oct. 29, 1998

(30) Foreign Application Priority Data
Apr. 21, 1997 (RU) ................................. 97106392

(51) Int. Cl.$^7$ ................. B01D 3/10; C10G 7/06
(52) U.S. Cl. ................. 203/91; 196/138; 196/140; 196/114; 203/26; 203/24; 203/DIG. 14; 203/100; 208/357; 208/366; 208/368
(58) Field of Search ................. 196/98, 114, 127, 196/138, 140; 159/24.1, 24.3, DIG. 16; 208/350, 366, 368, 357; 202/205; 203/91, 100, DIG. 14, 24, 26

(56) References Cited

U.S. PATENT DOCUMENTS 1,567,429   12/1925   Earl et al. .
2,105,935 * 1/1938   Swanson ................. 196/73
2,723,950 * 11/1955  Petersen ................. 208/366
3,579,307 * 5/1971   Wakita et al. ................. 422/131
5,935,388 * 8/1999   Meszaros ................. 202/155

FOREIGN PATENT DOCUMENTS 1050498   2/1959   (DE) .
2048156   11/1995  (RU) .
2050168   12/1995  (RU) .
2094070   10/1997  (RU) .
 559098   7/1977   (SU) .
1733714   5/1992   (SU) .

* cited by examiner

Primary Examiner—Virginia Manoharan
(74) Attorney, Agent, or Firm—Mark A. Oathout

(57) ABSTRACT

Essence of the invention is a: a liquid, whose saturated vapour pressure is not less than the pressure at the top of a rectification column, is delivered into the nozzle of a liquid-gas jet apparatus as a motive liquid; the pressure maintained in a separator represents from 1.1 to 160 times the pressure of a vapor phase at the inlet of the liquid-gas jet apparatus; condensation of easy-condensable components of the vapor phase in the motive liquid and forming of a liquid-vapor mixture take place after mixing of the vapor phase with the motive liquid; the liquid-vapor mixture is separated in the separator into a compressed gaseous component and a liquid medium.

The introduced method results in an increase in efficiency of a pumping-ejector system for the distillation of a liquid product.

3 Claims, 1 Drawing Sheet

OPERATION PROCESS OF A PUMPING-EJECTION STAND FOR DISTILLING LIQUID PRODUCTS

BACKGROUND OF THE INVENTION

The invention pertains to the field of jet technology, primarily to installations for producing a vacuum in rectification columns destined for the distillation of various separable liquid products.

A method of operation of a pumping-ejector vacuum system for crude oil rectification is known, which consists of feeding of a separable liquid product into a vacuum rectification column, separation of the liquid product into a vapor fraction and at least one liquid fraction, delivery of the liquid fraction into the nozzle of a liquid-gas jet apparatus by a pump, evacuation of the vapor fraction by the liquid-gas jet apparatus, mixing of the vapors with a motive liquid in the jet apparatus and condensation of easy-condensable components of the vapors in the motive liquid, and separation of the motive liquid from vapors in a separator (see U.S. Pat. No. 1,567,429, M cl. C 10 C7100, 1925).

However, this method of operation of a pumping-ejector installation is characterised by high power inputs and high consumption of the motive liquid, which must be purified before discharge to drainage.

There is also another known method of operation of a pumping-ejector installation for the distillation of a liquid product. This method includes delivery of a separable liquid product into a vacuum rectification column, separation of the liquid product into a vapor phase and at least one liquid fraction, delivery of the liquid fraction into the nozzle of a liquid-gas jet apparatus by a pump, evacuation of the vapor phase by the liquid-gas jet apparatus, mixing of the vapour phase with a motive liquid in the jet apparatus with simultaneous compression of the vapor phase and forming of a liquid-vapor mixture, and separation of the mediums' mixture into a liquid medium and a compressed gaseous component in a separator (see RU patent, 2048156, cl. B01 D3/10, 1995).

According to this method, evacuation of the vapor phase from the rectification column is effected by the liquid-gas jet apparatus. However, evacuation of the vapor phase by the liquid-gas jet apparatus is not accompanied by complete condensation of easy-condensable components of the vapor phase, which reduces output of a light fraction as the base product of the vacuum rectification column. Such is conditioned by the fact that correlation between pressure in the vacuum rectification column, pressure in the separator and saturated vapour pressure of the motive liquid, which is delivered into the nozzle of the liquid-gas jet apparatus, is not optimal.

SUMMARY OF THE INVENTION

The present invention is aimed at an increase of efficiency of a pumping-ejector system for the distillation of a liquid product, which can be achieved due to optimal correlation between pressure in a rectification column, pressure in a separator and saturated vapour pressure of a motive liquid of the pumping-ejector system.

The solution of above mentioned problem is provided by an operating process of a pumping-ejector system for the distillation of a liquid product, including feeding of a separable liquid product into a vacuum rectification column, fractionation of the liquid product into a vapor phase and at least one liquid fraction, delivery of the liquid fraction into the nozzle of a liquid-gas jet apparatus by a pump, evacuation of the vapor phase by the liquid-gas jet apparatus, mixing of the vapour phase with a motive liquid in the jet apparatus with simultaneous compression of the vapor phase and forming of a liquid-vapor mixture, separation of the mediums' mixture into a liquid medium and a compressed gaseous component in a separator, which is modified as follows:

a liquid, having a saturated vapour pressure not less than the pressure at the top of the rectification column, is delivered into the nozzle of the liquid-gas jet apparatus as the motive liquid;

the pressure maintained in the separator represents from 1.1 to 160 times the pressure of the vapor phase at the inlet of the liquid-gas jet apparatus;

condensation of easy-condensable components of the vapor phase in the motive liquid and forming of the liquid-vapor mixture take place after mixing of the vapor phase with the motive liquid and exit of the mixture from the liquid-gas jet apparatus, but before entry of the mixture into the separator, then the liquid-vapor mixture is separated in the separator into the compressed gaseous component and a liquid medium, where the latter is bled from the separator as the motive liquid.

This process enables one to change the composition of the motive liquid of the liquid-gas jet apparatus directly in the pumping-ejector system subject to the composition of the feed stock of the rectification column. After mixing of the vapor phase and the motive liquid, feeding of the liquid fraction under pressure from the rectification column into the mediums' mixture is possible and the outlet pressure of the liquid-gas jet apparatus can be reduced consequently. Condensation of easy-condensable components of the vapour phase in the liquid fraction and in the motive liquid can be provided during mixing of the two liquids (the liquid fraction and the motive liquid). A liquid-gas flow is formed as a result of feeding of the liquid fraction into a condenser and then into the separator. Further the liquid-gas mixture is separated in the separator into the compressed gaseous component and a liquid medium. The latter is delivered from the separator to the suction port of the pump as the motive liquid. Besides, feeding of the liquid fraction under pressure into the liquid medium is accompanied by partial transfer of kinetic energy from the liquid fraction to the liquid medium. As a result of mixing of both liquids, the final composition of the motive liquid, which passes further to the suction port of the pump, is formed.

Experimental research revealed that a correlation between saturated vapor pressure of the motive liquid and pressure in the top section of the rectification column, wherefrom the vapor phase proceeds into the liquid-gas jet apparatus, has great importance.

As a matter of fact, the saturated vapour pressure of the motive liquid is a factor which governs density, working temperature and partly the chemical durability of the motive liquid under rated operating conditions.

Maintaining such operating parameters and selecting such a motive liquid, which provides for implementation of the condition when the saturated vapour pressure of the motive liquid is not less than the pressure at the top of the rectification column, allow one to achieve the highest possible (near-design) capacity of the liquid-gas jet apparatus. It is necessary to signify, that pressure in the rectification column, more precisely—the pressure of the vapor phase at the inlet of the liquid-gas jet apparatus, has considerable influence on the quality of separation of mediums in the separator and, consequently, on efficiency of the pumping-ejector system, because performance of the liquid-gas jet apparatus depends on the thoroughness of the separation of the liquid-gas mixture in the separator. Besides, the required makeup supply of the motive liquid also depends on such pressure.

It was determined, that maintaining of the pressure in the separator within the range from 1.1 to 160 times that of the pressure of the vapor phase at the inlet of the liquid-gas jet apparatus ensures such a working mode of the pumping-ejector system when makeup supply of the motive liquid is not necessary because of effective degassing of the liquid medium in the separator. At the same time, conditions, when there are neither ebullition nor changing of physical and chemical parameters of the liquid medium, are generated in the separator due to the above described matching of pressures. Thus, one may deliver the motive medium with precisely adjusted physical and chemical parameters into the nozzle of the liquid-gas jet apparatus.

There is a variant of the introduced method which occurs when the required correlation of above mentioned pressures in the pumping-ejector system is kept automatically, independently from fluctuations of physical and chemical parameters of stock product of the rectification column.

Such can be ensured if the liquid fraction of the rectification column, whose saturated vapour pressure is always higher than the pressure at the top of the column, is fed under pressure into the circulation loop of the motive liquid. Two variants of such liquid fraction feeding are possible subject to the process conditions. The first variant: input of the liquid fraction into the circulation loop is effected beyond the outlet of liquid-gas mediums' mixture from the liquid-gas jet apparatus. The second variant: input of the liquid fraction is effected at the suction port of the pump. Both variants allow automatic correction of the motive liquid properties according to fluctuations of composition of the stock liquid product.

Thus, all of the above means ensure an optimal operation mode of the pumping-ejector system for the distillation of a liquid product.

BRIEF DESCRIPTION OF THE DRAWING

The drawing in FIG. 1 represents a schematic diagram of a pumping-ejector system embodying the introduced method.

DETAILED DESCRIPTION

Figure 1:
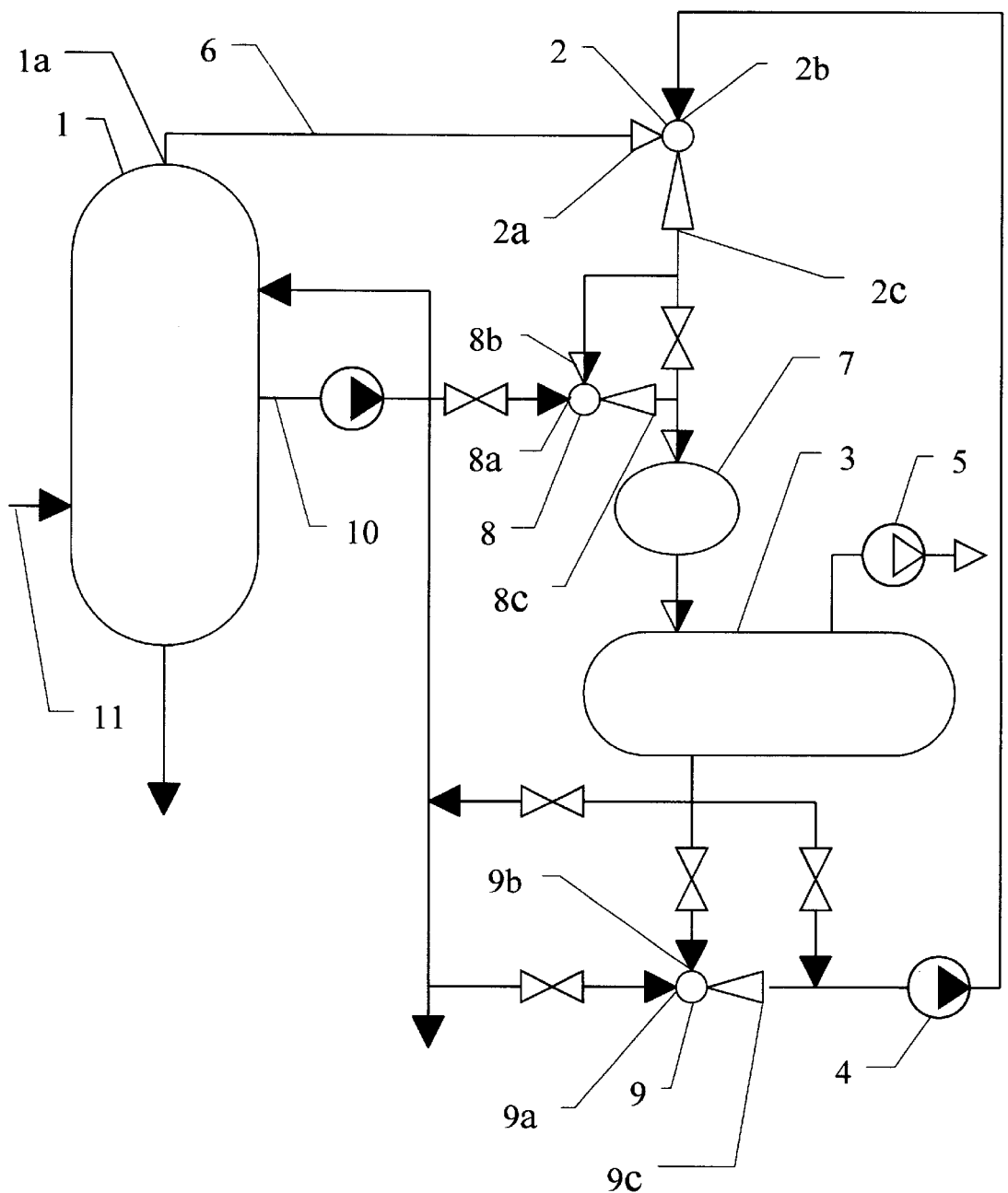

The pumping-ejector system comprises a vacuum rectification column 1, a liquid-gas jet apparatus 2, a separator 3, a pump 4 and a mechanical vacuum pump 5. A gas inlet 2a of the liquid-gas jet apparatus 2 is connected to a pipeline 6 for bleeding of a vapor phase, a liquid inlet 2b of the liquid-gas jet apparatus 2 is connected to the discharge side of the pump 4. Subject to the variations of operation, the system can be furnished with a condenser 7 and, if necessary, a jet pump 8 or a jet pump 9, or both. It is expedient if the condenser 7 is installed between an outlet 2c of the liquid-gas jet apparatus 2 and the separator 3, and if the jet pump 8 is installed beyond the outlet 2c of the liquid-gas jet apparatus 2. In this case the nozzle 8a of the jet pump 8 is connected to a pipeline 10 for bleeding of a liquid fraction from the rectification column 1, an inlet 8b for evacuated medium to the jet pump 8 is connected to the outlet 2c of the jet apparatus 2, and an outlet 8c of the jet pump 8 is connected to the condenser 7.

In the variation of the system's embodiment, where the additional jet pump 9 is installed, the nozzle 9a of the jet pump 9 is connected to the pipeline 10 for bleeding of the liquid fraction from the rectification column 1, an inlet 9b for evacuated medium to the jet pump 9 is connected to the separator 3 and an outlet 9c of the jet pump 9 is connected to the suction side of the pump 4.

The operating process of the pumping-ejector system for the distillation of a liquid product is implemented as follows:

A liquid product is fed into the vacuum rectification column 1, where the product is cut into a vapor phase and at least one liquid fraction. The pump 4 delivers a motive liquid under pressure into the nozzle of the liquid-gas jet apparatus 2. Evacuation of the vapor phase from the column 1 (through the pipeline 6) occurs during outflow of the motive liquid from such nozzle. A gas-liquid mixture is formed as a result of the mixing of the vapor phase and the motive liquid in the liquid-gas jet apparatus 2. Simultaneously, compression of the gaseous component of the mixture takes place due to partial transformation of kinetic energy of the motive liquid into potential energy of the gaseous component of the mixture. The gas-liquid mixture passes from the liquid-gas jet apparatus 2 into the condenser 7. Conditions for condensation of such mixture's components, whose partial pressure of saturated vapor is lower than the pressure at the top of the column 1, are provided in the condenser (by adjusting the temperature, for example). Then the gas-liquid mixture flows from the condenser 7 into the separator 3, where it is separated into a compressed gaseous component—compressed gas—and a liquid medium. The liquid medium from the separator 3 passes to the inlet of the pump 4 as the motive liquid, which is delivered under pressure into the nozzle of the liquid-gas jet apparatus 2. The compressed gas is evacuated from the separator 3 by the mechanical vacuum pump 5 (a liquid-ring pump, for example). At the same time the pressure inside the separator 3 is kept within the range from 1.1 to 160 times that of the pressure of the vapor phase at the inlet 2a of the liquid-gas jet apparatus 2.

If, for some reasons, liquid stock products of different composition are fed into the rectification column 1, a vapor phase and a liquid fraction with different physical and chemical parameters are obtained during distillation. This results in the necessity to correct the composition of the motive liquid of the pumping-ejector system. Under the introduced method the correction can be made without shutting down the system. A part of the liquid fraction from the rectification column 1 is delivered through the pipeline 10 into the nozzle 8a of the jet pump 8. Discharge of the liquid fraction from the nozzle of the jet pump 8 is accompanied by its mixing with the gas-liquid mixture and forming of a new mixture, which meets the requirements specified above for the correlation between the saturated vapor pressure of the motive liquid and the pressure at the top end 1a of the column 1. Simultaneously, suction of the liquid-gas mixture from the outlet 2c of the jet apparatus 2 and, consequently, decrease of pressure at the outlet 2c of the jet apparatus 2 occurs during discharge of the liquid fraction from the nozzle of the jet pump 8. All of this allows, either, to increase capacity of the jet apparatus 2 or to decrease pressure of its motive liquid. Then the mixture of mediums formed in the jet pump 8 flows into the condenser 7 and operation of the system proceeds as described above, i.e. a liquid-gas mixture is formed in the condenser 7 due to partial condensation of the vapor component of the mixture of mediums, the liquid-gas mixture goes into the separator 3, where it is separated into the liquid medium and compressed gas. The compressed gas is pumped out by the mechanical vacuum pump 5. The liquid medium proceeds to the inlet of the pump 4 and the pump 4 delivers it into the nozzle of the liquid-gas jet apparatus 2.

There is another variation of the system's embodiment in which the liquid fraction under pressure is delivered into the nozzle of the jet pump 9 and the jet pump 9 draws off the liquid medium from the separator 3. Then the mixture of liquids formed in the jet pump 9 flows under pressure to the inlet of the pump 4. Special features of such design of the system are that the composition of the motive liquid can be varied during the system's operation and a higher pressure at the inlet of the pump 4 can be ensured. The latter enhances a positive suction head of the pump and increases the pressure of the motive liquid in the nozzle of the liquid-gas jet apparatus 2. Therefore the capacity of the jet apparatus 2 is increased. In other respects this system works like the above described system with the condenser 7.

A variant of the system using both jet pumps 8 and 9 is also possible. In this case each of the jet pumps operates as described above and total capacity of the system can be increased considerably.

Industrial Applicability

The introduced operating process of a pumping-ejector system can be used in petrochemical and other industries, where the producing and maintaining of a vacuum are required.

What is claimed is:

1. An operational process for a pumping-ejector system for distillation of a liquid product, comprising the steps of:

feeding a separable liquid product into a rectification column having a top end, fractionating the liquid product into a vapor phase and at least one liquid fraction, delivering the at least one liquid fraction into a nozzle of a liquid-gas jet apparatus by a pump, evacuating the vapor phase by the liquid-gas jet apparatus, mixing the vapor phase and a motive liquid in the jet apparatus with simultaneous compressing of the vapor phase and forming a liquid-vapor mixture, separating the mixture in a separator into a liquid medium and a compressed gaseous component;

delivering a liquid having a saturated vapor pressure which is not less than a pressure at the top of the rectification column, into the nozzle of the liquid-gas jet apparatus as the motive liquid;

maintaining a pressure in the separator which is from 1.1 to 160 times the pressure of the vapor phase at a gas inlet of the liquid-gas jet apparatus;

after mixing of the vapor phase with the motive liquid and exiting of the liquid-vapor mixture from the liquid-gas jet apparatus, but before introducing the liquid-vapor mixture into the separator, condensing a condensable component of the vapor phase in the motive liquid and forming a subsequent liquid-vapor mixture;

separating the subsequent liquid-vapor mixture in the separator into the compressed gaseous component and the liquid medium;

and bleeding the liquid medium from the separator as the motive liquid.

2. The process according to claim 1, further comprising:

feeding the at least one liquid fraction from the rectification column under pressure into the liquid-vapor mixture beyond an outlet of the liquid-gas jet apparatus, but before entry of the liquid-vapor mixture into the separator whereby an outlet pressure of the liquid-gas jet apparatus is reduced; and introducing the liquid medium bled from the separator into a suction port of the pump as the motive liquid.

3. The process according to claim 1, further comprising:

feeding the at least one liquid fraction under pressure into the motive liquid after the motive liquid leaves the separator whereby the feeding of the at least one liquid fraction under pressure into the motive liquid is accompanied by a partial transfer of kinetic energy from the at least one liquid fraction to the motive liquid, and mixing of the at least one liquid fraction and the motive liquid whereby a liquid medium with a required composition is formed; and delivering the liquid medium to the inlet of the pump.

* * * * *